United States Patent Office 2,960,644
Patented Nov. 15, 1960

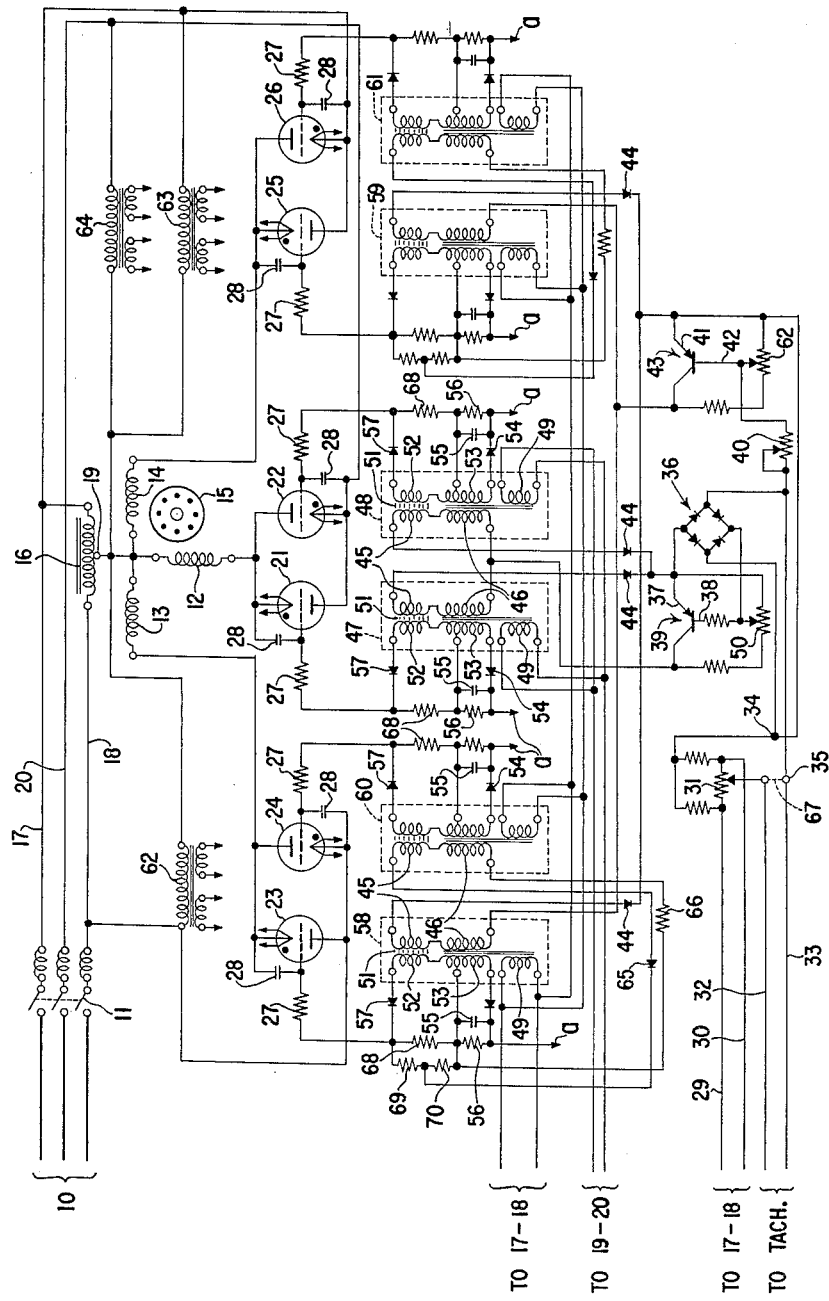

2,960,644

THYRATRON CONTROL OF A.C. MOTORS

James W. Momberg, Somerville, Edward W. Taylor, Martinsville, and James H. Burnett, Upper Montclair, N.J., assignors, by direct and mesne assignments, to The Singer Manufacturing Company, Elizabeth, N.J., a corporation of New Jersey Filed Feb. 19, 1959, Ser. No. 794,342

6 Claims. (Cl. 318—207)

This invention relates to the control of A.-C. motors using thyratrons with suitable grid control to supply the motor currents.

For many years the need for practical, static, reversing voltage control of high-power polyphase A.-C. induction motors has been recognized. Numerous methods of applying magnetic amplifiers or thyratrons have been described. Each of these schemes, however, in one or more ways, fails to meet all of the following desired characteristics for such equipment:

(1) Full motor voltage response in less than one cycle after a change in signal voltage.

(2) Symmetrical control of all motor phase voltages to avoid overheating of the motor at the null position and to prevent "single phasing."

(3) Stepless, proportional control always maintaining the optimum phase relationship between motor winding currents regardless of the magnitude of motor voltage in the proportional range.

(4) Linear torque versus input signal voltage characteristic.

(5) High efficiency.

(6) Compact light weight equipment.

(7) High reliability and low maintenance.

It is an object of this invention, therefore, to provide a thyratron control system for A.-C. polyphase induction servomotors having the above enumerated characteristics.

With the above and other objects in view, as will hereinafter appear, the invention comprises the devices, combinations and arrangements of parts hereinafter set forth and illustrated in the accompanying drawing of a preferred embodiment of the invention, from which the several features of the invention and the advantages attained thereby will be readily understood by those skilled in the art.

The single figure is a circuit diagram showing a preferred form of the invention.

In the figure, 10 represents a source of polyphase A.-C. voltage connected through a current-overload circuit-breaker 11 to motor windings 12, 13 and 14 as will be described presently. The motor 15 is preferably a two-phase A.-C. low inertia induction motor of the type shown and described in the U.S. Patent No. 2,438,872 to which reference may be had for a more complete understanding of the motor per se. The main winding 12 is located 90 electrical degrees in space phase from the control windings 13 and 14, which latter are identical windings in identical slots but the connections are such that, when energized, these windings 13 and 14 produce opposite phase effects and so provide means for reversing the direction of rotation of the motor, as will be more fully explained.

An autotransformer 16 connected across lines 17 and 18 provides a common center-tap 19 to which one end of each of the motor windings 12, 13 and 14 is connected. The other end of the main winding 12 is connected to line 20 through a pair of control rectifiers or thyratrons 21 and 22, connected mutually in back-to-back or antiparallel relation. The other end of control winding 13 is connected to line 18 through a pair of control rectifiers 23 and 24 connected in antiparallel relation and similarly, the other end of control winding 14 is connected to line 17 through a pair of control rectifiers 25 and 26 connected in antiparallel relation. It will be seen that this arrangement provides a T or Scott connection with the center tap 19 forming the junction for the T. This insures a firm, two-phase supply for the motor windings and establishes a desirable 90 degree time-phase relation between the motor currents substantially independently of the load, which condition is not true of the usual split-phase arrangements where a capacitor is used as the splitting element.

It will be seen that, by proper grid control of the thyratrons 21–26 inclusive, in effect, a variable-voltage two-phase supply may be produced, but without using any mechanically moving parts or switch contacts to slow down the system response due to inertia effects. The thyratrons handle the large motor currents directly when their grids are properly excited, as will now be described.

Each thyratron has a current-limiting resistor 27 in series with the grid and a transient-absorbing capacitor 28 connected from the grid to the cathode.

The circuit will be described with respect to speed control but it will be understood that the circuit also is adaptable to variable reversing positioning control, the difference being only in the way the error voltage is derived.

A reference voltage (derived from the voltage between lines 17 and 18) is fed by lines 29 and 30 to a potentiometer 31 used as a voltage divider. A speed voltage generated by an A.-C. tachometer generator (not shown) driven by the motor 15 is fed by lines 32 and 33, and its polarity is such that the voltage appearing at points 34 and 35 is the difference between the divided reference voltage and the tachometer voltage. This is the true error voltage and the system must behave to constantly drive this voltage toward zero.

The error voltage is applied to a bridge rectifier 36, the D.-C. output of which is connected to the emitter 37 and base 38 of a transistor 39. The error voltage is also applied through a variable resistor 40 to the emitter 41 and base 42 of a transistor 43.

Transistor 39 has its output or collector-emitter circuit connected through half-wave diodes 44 to series-connected windings 45 and 46 of grid control transformers 47 and 48. Input windings 49 are connected to the main phase voltage appearing across 19—20. The collector and bias voltages are thus supplied through the diodes 44 and bias adjustment is made by potentiometer 50. The adjustment is such that, with zero error voltage applied to transistor 39, the collector-emitter circuit is fully conducting and maximum current flows in the control winding 45 in the half-cycle permitted by diode 44 to saturate the core of saturable reactor 51 having a load winding 52. A winding 53 with diode 54 and filter condenser 55 provides a continuous, negative bias voltage across resistor 56 which keeps the thyratrons 21 and 22 cut off in the absence of an error voltage.

As the error voltage increases, the transistor 39 is driven towards cut-off which reduces the control current in winding 45. The result of this decrease in control current is to advance the phase of a positive output voltage pulse supplied through diodes 57 to resistors 58. This positive pulse overcomes the negative hold-off bias and determines the firing angle of the grids of thyratrons 21 and 22 and thus controls the amount of current to the motor winding 12. The grid returns indicated by "a" for each thyratron should be connected to the filament center tap of its associated thyratron, as is well known in the art. By proper phasing of the input windings 49 of transformers 47 and 48 this circuit supplies full wave voltage to the motor winding 12.

For a more complete explanation of the phase shifting of the grid-firing pulses with variation in control current as above described, reference may be had to an article "A Magnetic Thyratron Grid Control Circuit"; Proceedings of the Institute of Radio Engineers, vol. 44, No. 4, April 1956, pp. 529–532.

It will be seen that the use of the bridge rectifier 36 makes the current supply to the main winding 12 insensitive to the reversal of the phase of the error voltage. Actual reversal of the motor 15 comes about through selective energization of either winding 13 or winding 14 responsively to the phase reversal of the error voltage. That is to say, thyratrons 23 and 24 conduct for one polarity of the error voltage while thyratrons 25 and 26 conduct for reversed polarity of the error voltage. This is taken care of by phasing the connections so that the grid voltage goes positive on positive swings of the anode voltage when conduction is desired and a chart of the instantaneous polarity of the voltages involved with respect to rotation would be as follows:

24, phased to cause conduction on the positive swings of the anode voltage.

It will be understood that the grid control for thyratrons 25 and 26 by transformers 59 and 61 is the same as described above except that the anode voltages are reversed relative to the grid firing pulses as indicated in the tabulated data given above, which causes the two pairs of tubes to be selectively fired in the alternative, depending on the polarity of the error voltage, to produce reversible control of the motor.

It will also be understood that the bias-adjustment potentiometers 50 and 62 set the operating conditions for zero error and the variable series resistor 40 controls the relative power level of the main phase amplifier with respect to the control phase amplifier for balancing the power inputs to the motor windings to provide symmetrical control of all motor phase voltages. Since both motor phase voltages are proportionally controlled from full "off" to full "on," the motor torque varies as the square of the motor voltage. However, the characteristic of the transistor-magnetic grid circuit is non-linear in the opposite sense, and the result is a torque versus signal voltage characteristic which is linear over a wide

| Tubes | 23 | | 24 | | 25 | | 26 | | |
|---|---|---|---|---|---|---|---|---|---|
| Anode | + | − | − | + | − | + | + | − | C. W. Rotation. |
| Grid | + | − | − | + | − | − | − | − | |
| Conduction | Yes | No | No | Yes | No | No | No | No | |
| Anode | + | − | − | + | − | + | + | − | Do. |
| Grid | − | − | − | − | − | + | + | − | |
| Conduction | No | No | No | No | No | Yes | Yes | No | |

It will be understood that the grid control transformers 47, 48, 58, 59, 60 and 61 are substantially identical units and similar windings thereof carry the same reference numerals. Further, filament supply transformer 62 furnishes filament voltages to tubes 23 and 24, transformer 63 to tubes 25 and 26 and transformer 64 to tubes 21 and 22. Actual line connections are indicated by arrows rather than by lines drawn in, to avoid confusion but they will be obvious to one skilled in the art.

The output or collector-emitter circuit of transistor 43 is connected through diode 44 to series-connected windings 45 and 46 of grid control transformer 58. The input winding 49 of this transformer is connected to the control phase voltage appearing across 18—19. The collector and bias voltages are thus supplied through the diode 44, and bias adjustment is made by potentiometer 62. The adjustment is such that, with zero error voltage applied to transistor 43, the collector-emitter circuit is fully conductive and maximum current flows in the control winding 45 in the half-cycle permitted by diode 44 to saturate the core of saturable reactor 51 having a load winding 52.

As the error voltage increases, the transistor 43 is driven towards cut-off which reduces the control current in winding 45. The result of this decrease in control current is the same as described above with respect to the winding 45 of transformer 47, viz., it advances the phase of the positive output voltage pulses (supplied through the diode 57) with respect to the control phase voltage. These positive pulses overcome the negative hold-off bias furnished by the winding 53, diode 54 and filter condenser 55, and which appears across resistor 56. The phase position of the positive pulses determines the firing angle of the grid of thyratron 23 and thus controls the amount of half-wave current to the motor winding 13.

The signal for controlling the firing of thyratron 24 to supply the other half-wave of current to the motor winding 13 is derived from the positive pulse voltage across resistor 68 by a voltage divider made up of resistors 69 and 70 and is applied through diode 65 and resistor 66 to the series-connected windings 45 and 46 of transformer 60 which provides grid-firing pulses for thyratron range. This linearity can be established to a very close degree by adjustment of the potentiometers 50 and 62 and of the variable resistor 40. Where, as in this case, the control equipment is supplied with a motor as a packaged unit the flexibility afforded by these adjustable units in securing a desired over-all characteristic is of considerable practical importance.

For positioning control, the tachometer voltage is not used, so that lines 32 and 33 may be connected together as indicated by the dotted line 67 in the figure. The fixed reference voltage applied to lines 29 and 30 is then replaced by a variable reference voltage which is proportional to the error of position and whose polarity depends on whether the error is plus or minus. Means for deriving such a positional error voltage are well known in the art as exemplified by the system disclosed in United States Patent No. 1,586,233.

While the embodiment of this invention as shown uses gaseous control rectifier tubes, it is not to be construed as so limited but shall include within its scope solid-state thyratrons, silicon controlled rectifiers and any other devices in which the conduction cycle is controlled by voltage applied to a third electrode.

Since the fundamental harmonic of current in each motor winding is at all times lagging its respective supply voltage by equal delay angles, and the supply voltages are displaced exactly ninety degrees by virtue of the Scott-connection formed by the center tapped autotransformer and motor windings; the motor winding currents are displaced ninety degrees regardless of the direction of motor rotation and the firing angle of the controlled rectifiers. This results in optimum motor operation over the full range of proportional, and reversing control.

The inverse parallel connected thyratrons in series with the control phases are controlled by magnetic reset grid circuits, one of which is controlled by the output of the other magnetic grid circuit. In this way a single transistor in common with two magnetic grid circuit input circuits can discriminate the phase of the A.-C. signal voltage supplied to the transistor.

Having thus described the nature of the invention, what we claim herein is:

1. A control system for a two-phase alternating current motor having a main phase winding and two opposed control phase windings comprising a three-phase power supply, pairs of grid-controlled electric discharge tubes, each pair connected mutually in antiparallel, each of said pairs connected with its anode-cathode circuit in series between one phase of said power supply and a respective one of said windings, an auto-transformer connected across one phase of said supply and having a center-tap to which all windings are returned, a source of reversible signal voltage of variable magnitude, means responsive to the magnitude of said signal voltage for controlling the conductive periods of said tubes and means responsive to the reversal of said signal voltage for interchanging the energization of said control phase windings.

2. In combination a two-phase motor having a main phase winding and two opposed control phase windings, a three-phase power supply having three terminals, an auto-transformer connected to two of said terminals and having a center-tap, pairs of grid-controlled electric discharge valves connected in antiparallel relation, each of said pairs connected with its anode-cathode circuit in series between one of said supply terminals and one end of a respective one of said windings, all of said windings being connected at their other ends to said center-tap, a variable error signal voltage, means responsive to the magnitude of said signal voltage for controlling the conductivities of said discharge valves and means responsive to the polarity of said signal voltage for determining which one of said opposed control phase windings shall be energized.

3. A proportional reversing control system for a two-phase servomotor having a main phase winding and two opposed control phase windings, comprising a three-phase power supply, means for deriving from said supply a main phase voltage and a control phase voltage in relative phase quadrature, said motor windings being fed from the power supply through controlled rectifiers connected in pairs in antiparallel relation to provide a full-wave A.C. voltage, means for establishing a constant negative D.C. cut-off bias voltage applied to all of said rectifiers, a source of error signal voltage derived from said control phase voltage, means responsive to said signal voltage for applying positive pulses to said rectifiers to overcome said negative bias voltage, said pulses being shiftable in phase responsively to the magnitude of said signal voltage to determine the conductive periods of said rectifiers, and means responsive to the reversal of said signal voltage to interchange the conductivities between the pairs of rectifiers connected to said opposed control windings.

4. In a thyratron control system for a two-phase induction motor having a main phase winding and opposed control phase windings, a first transistor amplifier controlling currents to said main phase winding, a second transistor amplifier controlling currents to said control phase windings, a single error signal voltage applied to the inputs of said amplifiers, adjustable bias means for each of the amplifiers and adjustable means to control the relative over-all gain of the amplifiers, said adjustable control and bias means being effective to control the torque output versus signal voltage input characteristic of the system.

5. In a system for controlling the speed and direction of rotation of a motor, a two-phase induction motor having a main phase winding and two opposed control phase windings, a three-terminal source of three-phase power, an auto-transformer connected across one of said source phases and having a mid-tap, pairs of controlled rectifiers having their anode-cathode circuits connected mutually in antiparallel relation, each pair forming a path of controlled conductivity between one end of each of the motor windings and a respective one of said source terminals, the other ends of said motor windings being all connected to said mid-tap, a single variable signal voltage, means responsive to the magnitude of said signal voltage for controlling the conductive periods for each half-cycle of the anode-cathode voltages of said rectifiers, and means responsive to the polarity of said signal voltage for determining which pair of rectifiers connected to the control phase windings shall be rendered conductive.

6. In a thyratron control system for a two-phase induction motor having a main phase winding and opposed control phase windings, a three-phase source of power, means including a pair of grid-controlled rectifiers connected in antiparallel relation for connecting each of said control phase windings to said source of power, a pair of magnetic reset grid circuits for each pair of said tubes, and a single transistor signal amplifying means for controlling one grid circuit in each pair, said other grid circuit of each pair being controlled by said one grid circuit to provide phase discrimination for the signal voltage applied to the transistor amplifier.

No references cited.